United States Patent Office 3,109,752
Patented Nov. 5, 1963

3,109,752
OXIDATION-RESISTANT COATING ON ARTICLES OF YTTRIUM METAL
David R. Wilder and Cecil Denton Wirkus, Ames, Iowa, assignors to the United States of America as represented by the United States Atomic Energy Commission
No Drawing. Filed May 21, 1962, Ser. No. 196,535
6 Claims. (Cl. 117—129)

This invention deals with the coating of yttrium articles to make them oxidation-resistant, in particular to make them oxidation-resistant at elevated temperature.

Yttrium metal is frequently used for crucibles in which metals, and in particular uranium-chromium alloys, are melted. While the yttrium shows a high degree of inertness to the molten metals, it easily oxidizes on those parts that are in contact with air.

Coatings have been applied to yttrium capsules and other yttrium articles to be used at elevated temperature in an attempt to protect them from oxidation. Commercial so-called iron-coating frits have been used for this purpose, but these had a number of drawbacks. The temperature for "firing" these frit coatings had to be kept within a rather narrow range, which caused some difficulties. Deviation from the critical range caused development of cracks and pin holes during firing, so that the purpose of the coatings was defeated and oxygen had access to the yttrium metal.

Most of the frits for iron have components with high capture cross sections for thermal neutrons (boron and cobalt, for example) and would therefore not be suitable for reactor use. Also, most of the frits for iron are not suitably protective at temperatures as high as 900° C.

It is an object of this invention to provide a coating on yttrium metal which protects it from reaction with oxygen at temperatures up to about 900° C.

It is another object of this invention to provide a coating on yttrium metal which has a low cross section and therefore is suitable for use in a reactor.

It is still another object of this invention to provide a coating on yttrium metal which does not peel, crack or flake during or after firing nor during use at elevated temperature.

It is finally an object of this invention to provide a coating on yttrium metal which can be fired within a broad temperature range.

It was found that the addition of from 5 to 35 percent by weight of cerium dioxide to phosphate-base or silicate-base glasses yields a composition, which, when applied to the surface of yttrium articles and melted thereon by "firing," protects the yttrium from oxidation at elevated temperatures up to 900° C.; no cracking, peeling or flaking of the coating occurs with these coatings.

The process of this invention thus comprises fritting a silicate-base or phosphate-base glass mixture, grinding the frit obtained, adding from 5 to 35 percent by weight of cerium dioxide, uniformly suspending the ground frit and $CeO_2$ in a liquid medium, cleaning the yttrium surface to be treated, applying the frit suspension to the cleaned surface, and firing the coating thus obtained.

Many silicate- or phosphate-base glasses are suitable for this invention. Compositions containing from 55 to 75 percent by weight of $SiO_2$ or from 65 to 85 percent by weight of $P_2O_5$, from 0 to 15 percent by weight of calcium carbonate, from 15 to 40 percent by weight of sodium carbonate, from 0 to 20 percent by weight of titanium dioxide and from 0 to 5 percent by weight of nickel or iron oxide are preferred.

The mixture of glass components is first fritted, preferably by heating it to a temperature of from 1150 to 1300° C. After fritting, the material is ground to a powder which then is mixed with the $CeO_2$ and suspended in a liquid medium. Water and/or alcohol, for instance, are suitable media. The yttrium article whose surface is to be coated is then prepared for application of the suspension by cleaning it with emery cloth and/or by treatment with trichloroethylene, as is known to those skilled in the art. Thereupon the suspension is applied immediately, for instance by immersion, by brushing, or by spraying.

The coated article is then fired for fusion and homogenization of the coating to a temperature within the range of from 900 to 1250° C. and preferably within the range of 1050 to 1250° C. This temperature depends to a certain degree on the content of cerium dioxide and the composition of the base glass, lower cerium dioxide contents and phosphate glasses requiring a lower temperature than higher cerium dioxide contents and silicate glasses. Fusion is carried out in air, and the temperature is maintained for from 1 to 15 minutes.

In the following, a few examples are given to illustrate the invention.

*Example I*

A glass mixture was prepared from 68.16% by weight of $SiO_2$; 7.47% of $TiO_2$; 15.97% of $Na_2CO_3$; 4.67% of MgO; 1.87% of NiO; and 1.87% of $Fe_3O_4$.

This mixture was fritted at 1300° C. and ground upon cooling. Eighty-five parts by weight of this frit were ball-milled in ethyl alcohol with 15 parts by weight of $CeO_2$.

A flat yttrium plate was surface-cleaned with an emery cloth, washed with trichloroethylene, dried and then sprayed lightly on one side with the alcohol suspension. The coated sample was fired in air at a temperature of 1200° C. for three minutes, thereafter withdrawn from the furnace and allowed to cool.

The coated plate was placed in another furnace at 900° C. and allowed to remain there for one hour. At the end of one hour the plate was removed from the furnace and examined. A considerable quantity of flaky oxide had formed on the uncoated back and sides of the plate, while no oxidation had occurred on the coated surface.

*Example II*

A glass was prepared by mixing 51.75% by weight of $SiO_2$; 31.29% of $Na_2CO_3$; 11.39% of $CaCO_3$; 3.18% of $TiO_2$; and 2.39% of NiO.

This mixture was fritted at 1150° C. whereby a glass of the following composition was obtained: 63.11% by weight of $SiO_2$; 22.33% of $Na_2O$; 7.77% of CaO; 3.88% of $TiO_2$; and 2.91% of NiO.

This frit was ground, and 70 parts by weight of it were mixed with 30 parts by weight of $CeO_2$ in a ball mill after the addition of a solution containing equal volumes of water and ethyl alcohol. A small yttrium plate was ground clean with an emery cloth, drilled, fitted with a platinum wire hanger, and sprayed on all surfaces with the alcohol-water suspension. The plate was then hung up in a furnace at 1150° C. and held there for 1½ minutes. The sample was then removed, cooled, and placed in another furnace at 750° C. for testing of the coating; it remained there for one hour. At the end of this period, no visible oxidation had occurred.

*Example III*

A composition was prepared by mixing 63.70% by weight of $SiO_2$; 13.65% of $TiO_2$; 21.75% of $Na_2CO_3$; and 0.90% of NiO.

This mixture was fritted at 1300° C. Seventy-five parts by weight of this frit were ball-milled for one hour in ethyl alcohol with 25 parts by weight of $CeO_2$ to yield a well mixed suspension.

A section of yttrium tubing, one-inch long and having a ¾-inch outside diameter and walls 1/16-inch thick, was ground clean inside and outside and sprayed with the alcohol suspension. The coated piece was fired three minutes at 1200° C. After firing the tube was placed in a furnace at 600° C. for testing and left there for 65 hours. After 65 hours the sample surface was greenish-yellow in color, but no destructive oxidation had occurred.

*Example IV*

A composition was prepared by mixing 76.51% by weight of $(NH_4)_2HPO_4$; 7.06% of $Al_2O_3$; 14.08% of $Na_2CO_3$; and 2.35% of $Fe_3O_4$.

This composition was fritted at 1150° C. This frit was ground. Eighty-five parts by weight of the frit were mixed with 15 parts by weight of $CeO_2$ and the mixed powder was suspended in ethyl alcohol.

A sealed yttrium capsule was polished with emery cloth, washed with trichloroethylene, sprayed with the alcohol suspension and fired at 1050° C. for 1½ minutes. The capsule was then heated in air at 900° C., which is above the softening point of the coating. Oxidation was greatly retarded by the coating with good protection being afforded for about seven hours. Thereafter, destructive oxidation began to occur.

*Example V*

Seventy weight percent of the phosphate frit described in Example IV was mixed with 30 weight percent of $CeO_2$. The powders were ball-milled together in ethyl alcohol for one hour and then painted on a flat yttrium plate that had been ground clean with emery cloth on one side and subsequently washed with trichloroethylene. The coated plate was fired in air for two minutes at 1150° C. It was then placed in another furnace at 900° C. and left there for three hours. At the end of this period considerable flaky oxide had formed on the unprotected surface.

It will be understood that the invention is not to be limited to the details given herein but that it may be modified within the scope of the appended claims.

What is claimed is:

1. A process of protecting yttrium metal surfaces from oxidation, comprising fritting a glass mixture selected from the group consisting of phosphate-base glass mixture and silicate-base glass mixture; grinding the frit obtained; adding from 5 to 35% by weight of cerium dioxide to the ground frit; uniformly suspending the frit mixture in a liquid medium; cleaning the yttrium surface to be treated; applying the frit suspension to the cleaned surface, and firing the coating thus obtained.

2. The process of claim 1 wherein the glass mixture consists of from 65 to 85% by weight of phosphate, from 0 to 15% of calcium carbonate, from 15 to 40% of sodium carbonate, from 0 to 20% of titanium oxide and from 0 to 5% of an oxide selected from the group consisting of nickel oxide, iron oxide and a mixture of the two.

3. The process of claim 1 wherein the glass mixture consists of from 55 to 75% by weight of silica, from 0 to 15% of calcium carbonate, from 15 to 40% of sodium carbonate, from 0 to 20% of titanium oxide and from 0 to 5% of an oxide selected from the group consisting of nickel oxide, iron oxide and a mixture of the two.

4. The process of claim 1 wherein fritting is carried out at a temperature of between 1150 and 1300° C. and firing at a temperature of between 900 and 1250° C.

5. The process of claim 4 wherein the firing temperature is within the range of from 1050 to 1250° C.

6. The process of claim 1 wherein the liquid medium is a compound selected from the group consisting of water, alcohol and water-alcohol mixture.

No references cited.